United States Patent Office 3,085,424
Patented Apr. 16, 1963

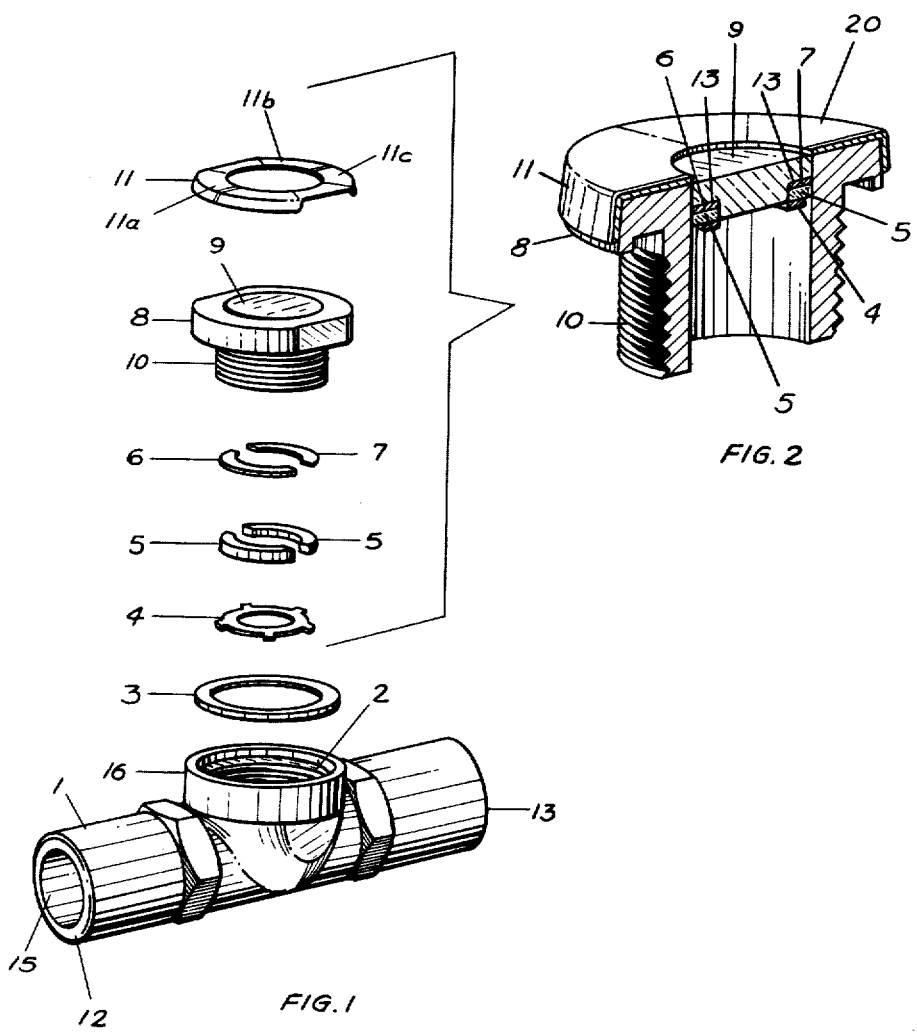

3,085,424
MOISTURE INDICATOR HOUSING
Alfred V. Berg, Menominee, Mich., assignor to Ansul Chemical Company, Marinette, Wis., a corporation of Wisconsin
Filed Nov. 17, 1959, Ser. No. 853,653
1 Claim. (Cl. 73—53)

This invention relates to a device for supporting moisture indicating color elements in a housing adapted for insertion in a fluid system, especially a refrigeration system.

Moisture indicating color elements such as those described in U.S. Patents No. 2,761,312 and 2,836,974 are usually mounted in a sight glass or similar unit so they can be viewed while exposed to the refrigerant fluid. However, if the elements are exposed too freely to the refrigerant stream, they are subject to accumulations of dirt and they shortly become so obscured as to be useless or if protected to the extreme, the access of the refrigerant stream to them is so restricted that an excessive length of time is required for them to come to equilibrium.

The preferred method of inserting these viewing units in the system is by a sweat solder connection. However, when the units of prior art, in which the moisture indicating elements had been permanently assembled, were inserted in this manner, the heat of the soldering operation decomposed the elements and rendered them useless. To overcome this difficulty, the viewing units of the prior art added extensions 4 to 6 inches long to the main body of the unit before assembling the elements in them so that the heat of the soldering operation would be removed from the elements so not to decompose them. This practice resulted in such large and unwieldly units that most moisture indicators were inserted into the system with flare fittings, although this was not the preferred procedure.

It is an object of this invention therefore to provide a compact moisture indicator which can be sweated into the refrigeration system without damage to the moisture indicating element. It is a further object of this invention to provide a mounting for the element which, while protecting it from dirt and other foreign matter, will nevertheless enable it to be readily accessible to the refrigerant fluid so that a rapid response to the moisture content of the refrigerant is obtained. Further details and advantages of my invention will be apparent from the following description and accompanying drawings, wherein FIGURE 1 is an exploded perspective view of the entire device, and FIGURE 2 is a section through the removable color indicator assembly.

Referring to FIGURE 1, the device is comprised of two major portions, a hollow roughly T-shaped body member and a removable element assembly, the constituents of which are shown bracketed. The body 1 is preferably manufactured from a T-shaped brass forging having a short threaded side connection 2 which is in communication with the main passageway 15. As shown, the ends 12 and 13 of this body are adapted for a sweat solder connection to the refrigeration system although one or both could obviously be adapted for a flare connection with no difficulty.

The removable assembly, indicated generally by numeral 20, comprises a housing 8 containing a viewing glass 9 which is preferably fused in, although other methods of mounting this glass may be used. The underside of the viewing glass 9 is provided with arcuate recesses or grooves 13 at its outer periphery. Moisture indicating arcuate-shaped color indicating elements 6 and 7, prepared according to the patents above enumerated, are inserted into the aforementioned recesses 13 and are held by the arcuate-shaped backing pads 5 which are secured in place by a self-locking retaining ring 4. The backing pads are made of a material which is very porous and inert to the chemicals of the indicating element, such as felt of Dacron (polyester) fibers. This assembly is fitted into the body by engaging the threads 10 of the element support with threads 2 of the body, the joint being rendered pressure tight by gasket 3. The color chart plate 11 which is assembled to the element housing with an adhesive has segments 11a, 11b and 11c of a color corresponding to the wet and dry conditions of either color elements 6 and 7 for ready reference and comparison.

The self-locking retaining ring 4 is preferably made of copper plated steel or Phosphor bronze to minimize corrosion problems. FIGURE 2 further illustrates the manner of mounting the indicating elements 6 and 7 in the recesses in the viewing glass 9. Backing pads 5 hold the indicating color elements securely against the under side of the glass, preventing an accumulation of dirt on the visible faces of the indicating color elements, the porous nature of the back-up pads permitting access of the refrigerant to the underside of the elements while filtering out any dirt which may be in the refrigerant. They also isolate the indicating color elements from the retaining ring 4. This is desirable because under conditions of excessive moisture the chemicals of the indicating elements corrode the retaining ring and also are contaminated by the materials of the ring.

To install this unit in the refrigeration system, the body member 1, minus the element assembly 20, is sweated into the refrigerant line and after the joints are cooled the color element assembly 20 is then installed. The small dimensions of the body member 1 facilitate selection of the proper spot for its installation. If the color elements should become damaged through some unusual circumstances, they can be readily replaced by installing a new housing assembly without disturbing the main body sweated connections.

It is to be understood that the foregoing specific construction is to be considered merely as illustrative embodiment of the present invention and that modifications and changes may be made which are intended to be included within the scope of the appended claim.

I claim:

A self-contained moisture indicating device for use in combination with a T-shaped body having open ends which may be attached by heat sealing means to a refrigerant passageway comprising: a tubular housing having threads at one end for threaded engagement with an opening in the T-shaped body, a viewing window centrally mounted in said housing and flush with one end thereof, said window having a plurality of narrow arcuate recesses at the periphery thereof so that the central portion of said window is unobstructed, a moisture indicating color element mounted in each recess, an inert back-up pad positioned in contact with each indicating element, a self-locking centrally apertured retaining means engaging said housing and retaining said indicator elements and said back-up pads in said recesses, a color chart plate located at the same end of said housing as said viewing window and immediately adjacent to said color indicating elements, said color indicating chart plate including a color chart for permitting a color comparison between color of said moisture indicating elements and said color indicating chart.

References Cited in the file of this patent

UNITED STATES PATENTS

| | | |
|---|---|---|
| 1,103,985 | Murray et al. | July 21, 1914 |
| 2,506,806 | Metzger | May 9, 1950 |
| 2,605,634 | Lewis | Aug. 5, 1952 |
| 2,815,662 | Thomas | Dec. 10, 1957 |
| 2,844,026 | Wischmeyer et al. | July 22, 1958 |
| 2,994,295 | Newcum | Aug. 1, 1961 |

UNITED STATES PATENT OFFICE
CERTIFICATE OF CORRECTION

Patent No. 3,085,424                                        April 16, 1963

Alfred V. Berg

It is hereby certified that error appears in the above numbered patent requiring correction and that the said Letters Patent should read as corrected below.

Column 1, line 39, after "indicator" insert -- housing --; column 2, line 12, after "pads" insert -- 5 --.

Signed and sealed this 12th day of November 1963.

(SEAL)
Attest:
ERNEST W. SWIDER
Attesting Officer

EDWIN L. REYNOLDS
Acting Commissioner of Patents